US012808998B2

(12) United States Patent
Pei et al.

(10) Patent No.: US 12,808,998 B2
(45) Date of Patent: Nov. 24, 2026

(54) SCANNING LIDAR WITH DISCRETE VERTICAL STEPS

(71) Applicant: Cepton Technologies, Inc., San Jose, CA (US)

(72) Inventors: Jun Pei, Saratoga, CA (US); Si Tan, Santa Clara, CA (US); Liqun Han, Pleasanton, CA (US); Dongyi Liao, Mountain View, CA (US); Roger D. Cullumber, Hollister, CA (US); Chang Seok Shin, Oakland, CA (US); Mark A. McCord, Los Gatos, CA (US)

(73) Assignee: Cepton Technologies, Inc., San Jose, CA (US)

( * ) Notice: Subject to any disclaimer, the term of this patent is extended or adjusted under 35 U.S.C. 154(b) by 552 days.

(21) Appl. No.: 18/531,507

(22) Filed: Dec. 6, 2023

(65) Prior Publication Data

US 2024/0183950 A1 Jun. 6, 2024

Related U.S. Application Data

(60) Provisional application No. 63/430,486, filed on Dec. 6, 2022.

(51) Int. Cl.

| | |
|---|---|
| ***G01S 7/48*** | (2006.01) |
| ***G01S 7/481*** | (2006.01) |
| ***G01S 17/26*** | (2020.01) |
| ***G02B 26/10*** | (2006.01) |
| ***G02B 26/12*** | (2006.01) |

(52) U.S. Cl.

CPC ............ *G01S 7/4817* (2013.01); *G01S 17/26* (2020.01); *G02B 26/101* (2013.01); *G02B 26/123* (2013.01); *G02B 26/129* (2013.01)

(58) Field of Classification Search

USPC ........................................................ 356/4.01

See application file for complete search history.

(56) References Cited

U.S. PATENT DOCUMENTS

| | | | |
|---|---|---|---|
| 4,410,269 A | 10/1983 | Jeffery | |
| 4,967,076 A | 10/1990 | Schuhmacher et al. | |
| 7,544,945 B2 * | 6/2009 | Tan | G01S 17/87 250/353 |
| 10,063,849 B2 * | 8/2018 | Pacala | G02B 3/0056 |
| 10,401,481 B2 * | 9/2019 | Campbell | G01S 17/931 |

(Continued)

OTHER PUBLICATIONS

U.S. Appl. No. 18/200,457, Non-Final Office Action, Mailed on Mar. 5, 2026, 10 pages.

(Continued)

*Primary Examiner* — James R Hulka

(74) *Attorney, Agent, or Firm* — Kilpatrick Townsend & Stockton LLP

(57) ABSTRACT

A scanning lidar has an illumination source comprising a plurality of lasers and a mirror system. The mirror system reflects light from the illumination source into an environment within a field of view. The mirror system includes a mirror arranged to rotate to reflect light from the illumination source to scan light from the plurality of lasers horizontally within the field of view of the system. The mirror system reflects light from the illumination source to position light, in discrete vertical steps, from the plurality of lasers vertically within the field of view.

20 Claims, 15 Drawing Sheets

(56) References Cited

U.S. PATENT DOCUMENTS

| | | | | |
|---|---|---|---|---|
| 10,451,740 | B2 | 10/2019 | Pei et al. | |
| 10,564,266 | B2 * | 2/2020 | O'Keeffe | G01S 17/931 |
| 10,571,567 | B2 | 2/2020 | Campbell et al. | |
| 10,578,720 | B2 | 3/2020 | Hughes et al. | |
| 10,649,072 | B2 * | 5/2020 | Bozchalooi | G01S 17/931 |
| 10,690,754 | B2 | 6/2020 | Pei et al. | |
| 10,921,432 | B2 | 2/2021 | Barbello et al. | |
| 11,022,688 | B2 * | 6/2021 | Eichenholz | G02B 27/0977 |
| 11,500,070 | B2 * | 11/2022 | Zheng | G02B 26/101 |
| 11,543,532 | B2 * | 1/2023 | Motoyama | G06T 7/50 |
| 11,762,068 | B2 * | 9/2023 | Donovan | G01S 7/484 356/5.01 |
| 11,965,964 | B2 * | 4/2024 | Donovan | G01S 7/4815 |
| 11,977,168 | B2 * | 5/2024 | Angus | G01S 17/26 |
| 12,000,781 | B2 * | 6/2024 | Buchter | B60W 30/0956 |
| 2007/0181810 | A1 | 8/2007 | Tan et al. | |
| 2017/0307758 | A1 * | 10/2017 | Pei | B60R 11/04 |
| 2018/0167602 | A1 * | 6/2018 | Pacala | G02B 5/208 |
| 2018/0180720 | A1 | 6/2018 | Pei et al. | |
| 2018/0284237 | A1 | 10/2018 | Campbell et al. | |
| 2018/0284286 | A1 | 10/2018 | Eichenholz et al. | |
| 2018/0329037 | A1 | 11/2018 | Bozchalooi et al. | |
| 2019/0025412 | A1 | 1/2019 | O'Keeffe | |
| 2019/0154836 | A1 * | 5/2019 | Campbell | G01S 17/08 |
| 2019/0310351 | A1 | 10/2019 | Hughes et al. | |
| 2020/0200874 | A1 | 6/2020 | Donovan | |
| 2020/0209401 | A1 * | 7/2020 | Motoyama | G06T 7/50 |
| 2020/0300998 | A1 * | 9/2020 | Barbello | G06F 21/31 |
| 2020/0326425 | A1 | 10/2020 | Donovan et al. | |
| 2021/0041537 | A1 * | 2/2021 | Buchter | B60W 30/0956 |
| 2021/0063542 | A1 | 3/2021 | Zheng et al. | |
| 2022/0043159 | A1 | 2/2022 | Angus | |
| 2023/0375674 | A1 | 11/2023 | Pei et al. | |
| 2023/0375675 | A1 * | 11/2023 | Pei | G01S 7/4816 |
| 2025/0231300 | A1 * | 7/2025 | Shin | G01S 17/894 |

OTHER PUBLICATIONS

Invitation To Pay Additional Fees And, Where Applicable, Protest Fee dated Jul. 31, 2023 in related International Application No. PCT/US23/23064 (two pages).

International Search Report and Written Opinion of the International Searching Authority dated Oct. 3, 2023 in related International Application No. PCT/US2023/023064 (15 pages).

U.S. Appl. No. 18/200,451, Non-Final Office Action, Mailed On May 1, 2026, 11 pages.

* cited by examiner

SCANNING LIDAR WITH DISCRETE VERTICAL STEPS

CROSS-REFERENCES TO RELATED APPLICATIONS

This application claims the benefit of U.S. Provisional Patent Application No. 63/430,486, filed on Dec. 6, 2022, which is incorporated by reference in its entirety for all purposes.

BACKGROUND

Three-dimensional (3D) sensors can be applied in various applications, including in autonomous or semi-autonomous vehicles, drones, robotics, security applications, and the like. Lidar sensors are a type of 3D sensor that can achieve high angular resolutions appropriate for such applications. A lidar sensor can include one or more laser sources for emitting laser pulses and one or more detectors for detecting reflected laser pulses. A lidar sensor can measure the time it takes for each laser pulse to travel from the lidar sensor to an object within the sensor's field of view, then reflect off the object and return to the lidar sensor. The lidar sensor can calculate a distance how far away the object is from the lidar sensor based on the time of flight of the laser pulse. Some lidar sensors can calculate distance based a phase shift of light. By sending out laser pulses in different directions, the lidar sensor can build up a three-dimensional (3D) point cloud of one or more objects in an environment.

SUMMARY

This disclosure relates to a scanning lidar system with a rotating mirror for horizontal scanning and, without limitation, to vertical positioning of light vertically in discrete steps.

In some configurations, a system for lidar comprises an illumination source comprising a plurality of lasers and a mirror system. The mirror system is arranged to reflect light from the illumination source into an environment within a field of view; the mirror system comprises a mirror arranged to rotate to reflect light from the illumination source to scan light from the plurality of lasers horizontally within the field of view of the system; and/or the mirror system is arranged to reflect light from the illumination source to position light from the plurality of lasers vertically within the field of view with discrete vertical steps. In some embodiments, a discrete step is equal to or less than a vertical pitch of the plurality of lasers in the field of view; a discrete step is equal to or greater than a vertical pitch of the plurality of lasers, so that scanlines from lasers of the illumination source are interlaced in the field of view; the mirror comprises a plurality of facets with different vertical angles; the different vertical angles of the plurality of facets are arranged to reflect light from the illumination source to position light from the plurality of lasers with discrete steps vertically within the field of view; the mirror is a first mirror; the mirror system comprises a second mirror; the second mirror is configured to step between tilt angles to reflect light from the illumination source to position light from the plurality of lasers with discrete steps vertically within the field of view; the second mirror is arranged to receive a dithering signal that dithers the second mirror at a dithering frequency; each laser of the plurality of lasers emits pulses of light at a firing rate; the dithering frequency is equal to or less than the firing rate and equal to or greater than 1/10 of the firing rate; the illumination source is a first illumination source; the plurality of lasers is a first plurality of lasers; the system comprises a second illumination source; the second illumination source comprises a second plurality of lasers; the mirror is a first mirror; the mirror system further comprises a second mirror and a third mirror; the second mirror is arranged to reflect light from the first illumination source to scan the first plurality of lasers horizontally within a first scan region of the field of view of the system; the third mirror is arranged to reflect light from the second illumination source to scan the second plurality of lasers horizontally within a second scan region of the field of view of the system; the second mirror is configured to step between a first set of tilt angles to reflect light from the first illumination source to position light from the first plurality of lasers with discrete steps vertically within the field of view; the third mirror is configured to step between a second set of tilt angles to reflect light from the second illumination source to position the second plurality of lasers with discrete steps vertically within the field of view so that light from the second plurality of lasers is vertically offset from the first plurality of lasers within the field of view; the second scan region horizontally overlaps at least 1/8 or 1/4 of the first scan region and does not overlap more than 7/8 or 3/4 of the first scan region; the first mirror is arranged to rotate about a first vertical axis; the mirror system comprises a second mirror; the second mirror is arranged to rotate about a horizontal axis to position light from the plurality of lasers vertically in the field of view; the second mirror is arranged to rotate about a second vertical axis to change a position of the field of view of the system in relation to the first mirror; the second mirror is configured to change the position of the field of view of the system vertically and horizontally in relation to the first mirror; the mirror (e.g., the first mirror) comprises a first layer and a second layer; and/or the second layer has facets that are offset from facets of the first layer.

In some configurations, a method comprises emitting light from an illumination source that comprises a plurality of lasers; rotating a mirror to reflect light from the illumination source into an environment to scan light from the plurality of lasers horizontally within a field of view; reflecting light from the illumination source to position light from the plurality of lasers vertically within the field of view with discrete vertical steps; and/or detecting, using a detector, light emitted from the illumination source, after light emitted from the illumination source is reflected into the environment. In some embodiments, the mirror is arranged to spin in a complete circle; a discrete step is equal to or less than a vertical pitch of the plurality of lasers in the field of view; a discrete step is equal to or greater than a vertical pitch of the plurality of lasers in the field of view so that scanlines from lasers of the illumination source are interlaced in the field of view; the mirror comprises a plurality of facets with different vertical angles; the different vertical angles of the plurality of facets are arranged to reflect light from the illumination source to position light from the plurality of lasers with discrete steps vertically within the field of view; the mirror is a first mirror; the method comprises reflecting light from the illumination source using a second mirror to position light from the plurality of lasers with discrete steps vertically within the field of view by tilting the second mirror at different angles by stepping between different tilt angles; the illumination source is a first illumination source; the method comprises reflecting light, using the mirror, from a second illumination source into the field of view; light from the first illumination source is reflected into a first scan region; light from the second illumination source is reflecting into a second scan region; the second scan region horizontally overlaps at least ⅛ or ¼ of the first scan region and does not overlap more than ⅞ or ¾ of the first scan region; the mirror is a first mirror; and/or the method comprises changing a position of the field of view in relation to the first mirror using a second mirror.

In some configurations, a system for lidar comprises an illumination source comprising a plurality of lasers and a mirror system. The mirror system comprises a first mirror and a second mirror. The first mirror is arranged to rotate about a first vertical axis to reflect light from the illumination source to scan light from the plurality of lasers horizontally within a field of view of the system. The second mirror is arranged to rotate about a horizontal axis to position light from the plurality of lasers vertically in the field of view. The second mirror is further arranged to rotate about a second vertical axis to change a horizontal position of the field of view of the system in relation to the first mirror.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment (s) will provide those skilled in the art with an enabling description for implementing a preferred exemplary embodiment. It is understood that various changes may be made in the function and arrangement of elements without departing from the spirit and scope as set forth in the appended claims.

Examples of some lidar systems that include a rotating mirror are described in commonly owned U.S. patent application Ser. No. 18/200,451, filed on May 22, 2023, which is incorporated by reference for all purposes. Additional lidar examples are given in commonly owned U.S. Pat. No. 10,451,740, issued on Oct. 22, 2019, U.S. Pat. No. 10,690, 754, issued on Jun. 23, 2020, and U.S. Pat. No. 10,921,432, issued on Feb. 16, 2021, the disclosures of which are incorporated by reference for all purposes.

Figure 1:
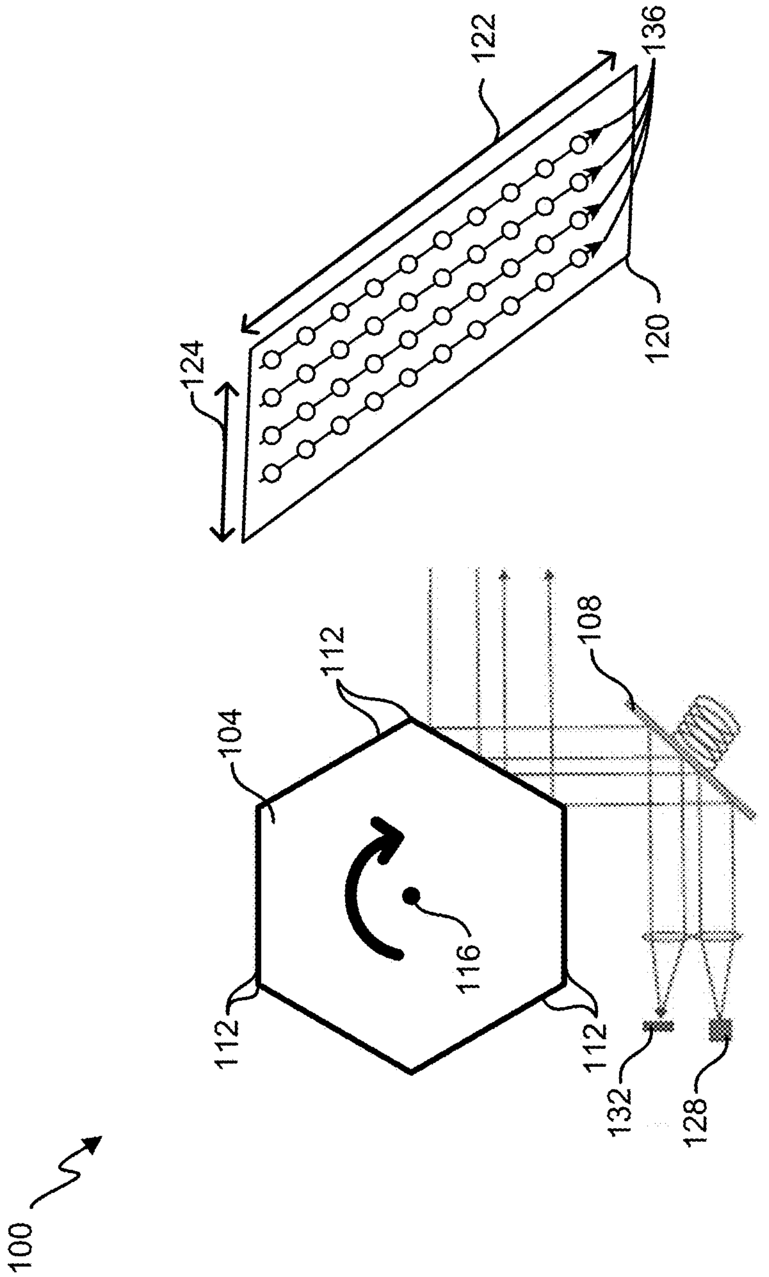
FIG. 1 illustrates an embodiment of a lidar sensor with a rotating mirror and a routing mirror.

FIG. 1 illustrates an embodiment of a lidar system 100 having a rotating mirror 104 and a routing mirror 108. The rotating mirror 104 can be a polygonal mirror with reflective facets 112. The rotating mirror 104 rotates (e.g., spins in a complete circle) about a vertical axis 116. Light is reflected by the rotating mirror 104 into a field of view (FOV) 120. The FOV 120 has a horizontal 122 component and a vertical 124 component. For example, a lidar system can be positioned on a car so that the vertical 124 component of the FOV 120 is in the direction of gravity, and the horizontal 122 component of the FOV 120 is orthogonal to the direction of gravity. Though the rotating mirror 104 is shown as a spinning mirror, in some embodiments, the rotating mirror rotates back and forth about an axis in an oscillating motion.

The rotating mirror 104 is used for scanning, horizontally, one or more laser beams (e.g., a pulsed laser beam) into the FOV 120 of the lidar system 100. The rotating mirror 104 has a number of planar, equal sized mirror facets fabricated on a spinning rotor. Though the number of facets 112 shown in FIG. 1 is six, the number of facets 112 could be equal to or greater than 2, 3, or 4 and/or equal to or less than 4, 5, 6, 7, 8, 10, or 12. A spinning mirror, such as the rotating mirror 104 shown in FIG. 1, has low vibration, low power requirement, and a linear scan characteristic. In an imaging lidar application, the rotating mirror 104 scans in the horizontal direction. To achieve high resolution in the other (e.g., vertical) direction, a vertical array of lasers (e.g., a large vertical array) and/or a galvo mirror may be used. The lidar system 100 depicted in FIG. 1 includes a laser 128 and a detector 132. Though only one laser 128 and one detector 132 are shown in FIG. 1, it is to be understood that more than one laser 128 and/or detector 132 can be used (e.g., a laser array and/or a detector array are used).

In some embodiments, a rotating polygon mirror is used to scan one or more lasers 128 in the horizontal direction, and the routing mirror 108 is used to fold a beam path to make a more compact layout. The routing mirror 108 in FIG. 1 is also used to position light pulses from the laser 128 in a vertical direction by dynamically tilting back and forth in the vertical direction (e.g., about a horizontal axis). This arrangement can achieve high resolution in the vertical direction while reducing and/or minimizing a number of lasers and/or can also make the lidar system 100 more compact. As shown in FIG. 1, the routing mirror 108 can effectively increase a number of scanlines 136 in the vertical 124 component of the FOV 120. This can be done with a single laser and/or with a vertical array of lasers. Each dot on the scanline 136 represents a laser pulse.

In some embodiments, the scanlines 136 are in discrete vertical steps. For example, the routing mirror 108 rotates to discrete positions for each scanline 136 (e.g., instead of the routing mirror 108 continuously rotating). If the routing mirror 108 continuously rotates, the scanline bends, and laser pulses are not emitted in a straight horizontal line. Having a scanline of laser pulses be in a curved line might not pose much of a problem if only one laser 128 is used. However, if multiple lasers are used, having straight scanlines can be helpful for creating a scan pattern in the FOV 120 with a desired density of data points (e.g., having light pulses from lasers spaced apart in a desired density pattern).

In some embodiments, a system for lidar (e.g., lidar system 100) comprises an illumination source comprising a plurality of lasers (e.g., an array of lasers comprising laser 128) and a mirror system (e.g., comprising the rotating mirror 104 and the routing mirror 108). The mirror system is arranged to reflect light from the illumination source into an environment within a field of view (e.g., FOV 120). The mirror system comprises a mirror (e.g., rotating mirror 104) arranged to rotate to reflect light from the illumination source to scan light from the plurality of lasers horizontally within the field of view of the system. The mirror system is arranged to reflect light from the illumination source (e.g., using routing mirror 108) to position light from the plurality of lasers vertically within the field of view with discrete vertical steps (e.g., scanlines 136 are separated by discrete vertical steps). The scanlines 136 are in straight (e.g., horizontal) lines.

Figure 2:
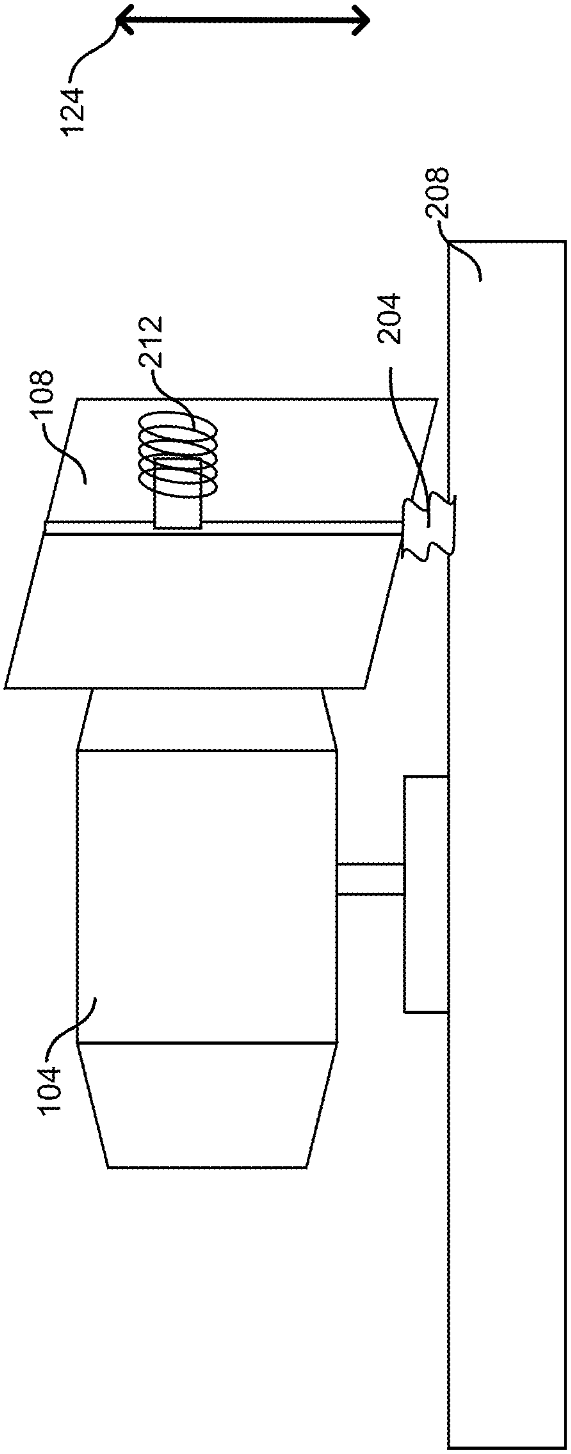
FIG. 2 depicts an embodiment of a routing mirror with a flexure mount.

FIG. 2 depicts an embodiment of the routing mirror 108 with a flexure 204 mount. FIG. 2 shows a side view with more details of the routing mirror 108. FIG. 2 shows the rotating mirror 104 and the vertical 124 component of the field of view (FOV) 120. The routing mirror 108, in this embodiment, comprises a flexure 204 connecting the routing mirror 108 to a base 208, to allow the routing mirror 108 to pivot, or rotate, in the vertical direction. Other means of pivoting can include, but are not limited to, a hinge, an axle with a bearing, and a pivot bearing. A voice coil 212 actuator is shown as a drive mechanism. Other drive mechanisms can include, but are not limited to, a rotating eccentric cam and a piezoelectric actuator.

Figure 3:
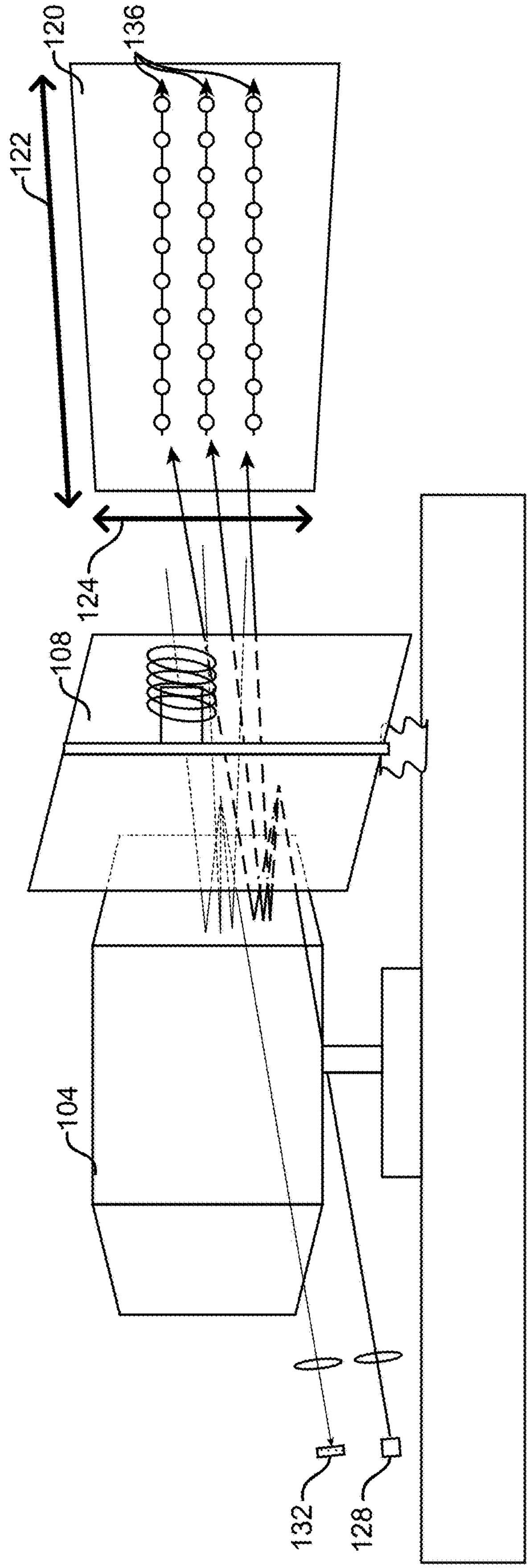
FIG. 3 depicts an embodiment of three discrete scanlines in a field of view using a routing mirror.

FIG. 3 depicts an embodiment of three discrete, horizontal, scanlines 136 in the field of view 120 using the routing mirror 108. FIG. 3 shows several scanlines 136 projected to a far-field FOV 120, each scanline 136 corresponding to a different vertical tilt angle of the routing mirror 108. The routing mirror 108 may step from one position to the next for each scanline 136, or it may move back and forth in a continuous fashion, which can result in scanlines 136 having a small vertical curve. If the routing mirror 108 moves continuously, the routing mirror 108 may do so in a resonant mode, which reduces or minimizes power usage.

The frequency of movement (e.g., stepping) of the routing mirror 108 can be similar to (e.g., matched to or timed with) a rotation frequency of the rotating mirror 104, so that each facet of the polygon combines with a different position of the routing mirror 108 to direct light from the laser(s) 128 to a different vertical position in the FOV 120.

Though three scanlines 136 are shown for one laser 128, there could be fewer or greater than three scanlines 136 for the laser 128. For example, the routing mirror 108 can step between two, three, four, five, six, seven, or eight positions, creating a corresponding number of scanlines 136 per laser 128 in the FOV 120.

In some embodiments, a lidar system comprises a first mirror (e.g., rotating mirror 104) and a second mirror (e.g., routing mirror 108). Wherein the second mirror is configured to step between tilt angles to reflect light from an illumination source (e.g., laser 128) to position a plurality of lasers with discrete steps vertically within the field of view (e.g., within FOV 120).

Figure 4:
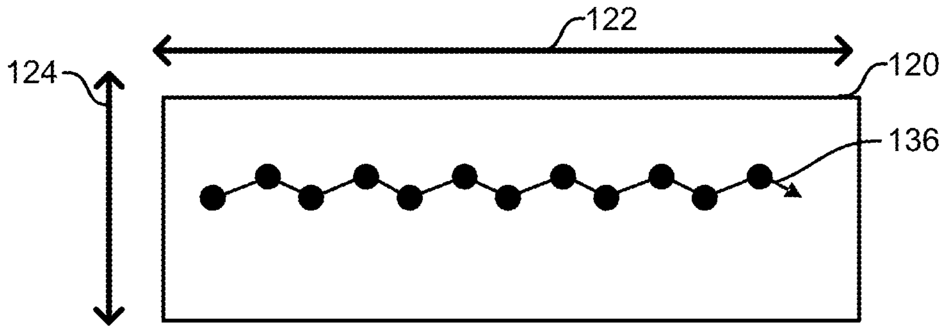
FIG. 4 depicts an embodiment of a laser pulse in the field of view, with a dithering signal applied to the routing mirror.

FIG. 4 depicts an embodiment of a laser pulse scanline 136 in the field of view 120 with a dithering signal applied to the routing mirror. The routing mirror may (e.g., in addition to stepping between scanlines) have a high frequency dither of motion in the vertical 124 direction, much higher than the rotation frequency of the rotating polygon mirror, and similar to a firing frequency of each of the laser(s) as the rotating polygon mirror scans lasers in the horizontal 122 direction. For example, if the routing mirror has a frequency that is exactly ½ the firing rate of the laser, then alternate laser spots along the scanline 136 will be displaced up and down in the vertical 124 direction, as shown in FIG. 4.

In some embodiments, a second mirror (e.g., the routing mirror 108 in FIG. 3) is arranged to receive a dithering signal that dithers the second mirror at a dithering frequency. Each laser of the plurality of lasers emits pulses of light at a firing rate. The dithering frequency is equal to or less than the firing rate and equal to or greater than 1/10, 1/5, 1/4, 1/3, or ½ of the firing rate.

Figure 5:
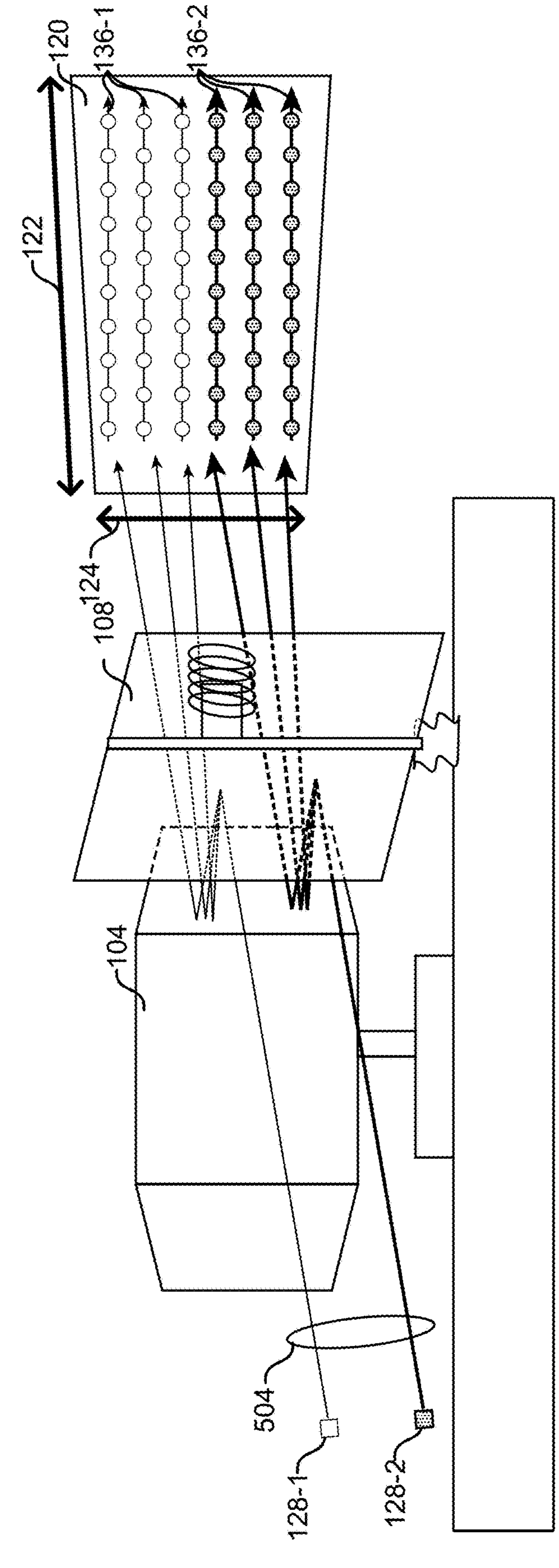
FIG. 5 depicts an embodiment of an array of lasers, wherein a discrete step of the routing mirror is equal to or less than a vertical pitch of the plurality of lasers in the field of view.

FIG. 5 depicts an embodiment of an array of lasers, wherein a discrete step of the routing mirror 108 is equal to or less than a vertical pitch of the plurality of lasers 128 in the field of view 120. A lens 504, is used to collimate light from lasers 128.

To further increase the vertical 124 component of the FOV 120 and/or vertical resolution, a vertical array of lasers may be used. The array of lasers in FIG. 5 comprises a first laser 128-1 and a second laser 128-2. Though only two lasers 128 are shown, more lasers could be used.

Figure 6:
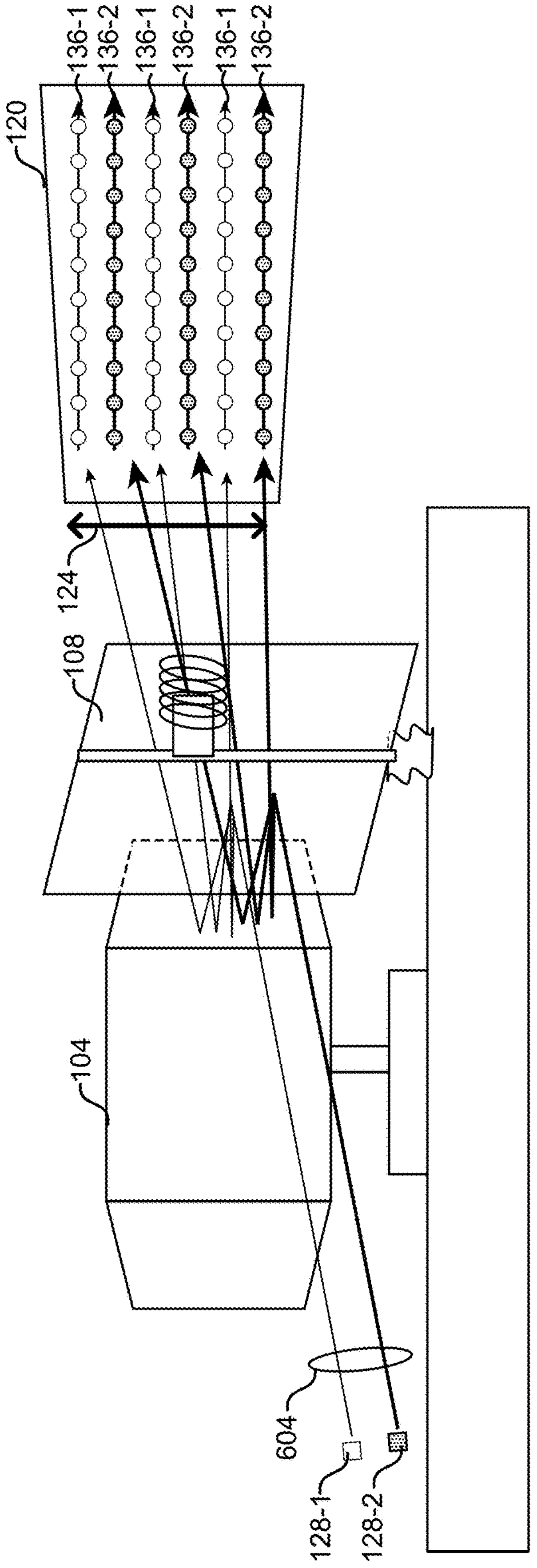
FIG. 6 depicts an embodiment of an array of lasers, wherein a discrete step of the routing mirror is equal to or greater than a vertical pitch of the plurality of lasers in the field of view, so that scanlines from lasers of the illumination source are interlaced in the field of view.

For a vertical array of lasers, vertical positioning can be done in two modes: a first mode, where vertical positioning is less than a pitch between laser (e.g., shown in FIG. 5), and a second mode, where vertical positioning is greater than a pitch between lasers (e.g., shown in FIG. 6).

In the first mode, the lasers 128 are widely spaced, with each laser 128 covering a different section of the vertical 124 component of the FOV 120. First scanlines 136-1 correspond to the first laser 128-1, and second scanlines 136-2 correspond to the second laser 128-2.

A small tilting motion of the routing mirror 108 is used so that each of the lasers 128 can scan multiple vertical positions within its section of the FOV 120, thus increasing the overall resolution and/or size of the vertical 124 component of the FOV 120. The multiple scanlines 136 can be combined into a single frame image of the lidar system by, for example, increasing the rotational speed of the polygon mirror compared to the frame rate. The array of lasers may share a common lens (e.g., collimating lens as shown) or each laser (or subset of lasers) may have its own lens.

FIG. 5 depicts an embodiment where a discrete step (e.g., in the vertical dimension) is equal to or less than a vertical pitch of the plurality of lasers (e.g., lasers 128) in the field of view (e.g., FOV 12). In FIG. 5 the first scanlines 136-1 do not overlap with the second scanlines 136-2 because the discrete steps of the routing mirror 108 are small so that the scanlines 136 of the lasers 128 do not overlap.

FIG. 6 depicts an embodiment of an array of lasers wherein a discrete step of the routing mirror 108 is equal to or greater than a vertical pitch of the plurality of lasers in the field of view 120, so that scanlines 136 from lasers 128 of the illumination source are interlaced in the field of view 120. This embodiment is the second mode.

In FIG. 6, the lasers 128 are vertically spaced much closer together than in FIG. 5. The routing mirror 108 is used to position light from the lasers 128 over the entire vertical 124 component of the FOV 120 to get full vertical coverage of the FOV 120. This implementation has the advantage of using smaller (or fewer) lenses 604, since multiple lasers 128 can more easily share a single lens, and cover a small vertical angle. A disadvantage of the second mode, compared to the first mode, is that the routing mirror 108 has a larger positioning range, which can increase mechanical complexity, power consumption, and/or noise or vibration of the routing mirror 108. In the embodiment shown in FIG. 6, a discrete step is equal to or greater than a vertical pitch of the plurality of lasers, so that scanlines 136 from lasers of the illumination source are interlaced in the field of view 120. For example, first scanlines 136-1 corresponding to the first laser 128-1 are interlaced with second scanlines 136-2 corresponding to the second laser 128-2.

In the first mode (in FIG. 5), the lens 504 is positioned to either cover the full vertical FOV, which increases the size and complexity of the lens 504, or multiple lenses 504 are used, one for each laser or a smaller subset of lasers 128 than all lasers 128 in the array.

If scanlines 136 in FIG. 5 and FIG. 6 were not straight lines (e.g., if a continuously rotating routing mirror were used and the scanlines curved a little vertically), then scanlines 136 might cross each other, or get closer to each other than desired, which could result in a less than desirable density of pulses in the FOV 120.

Figure 7:
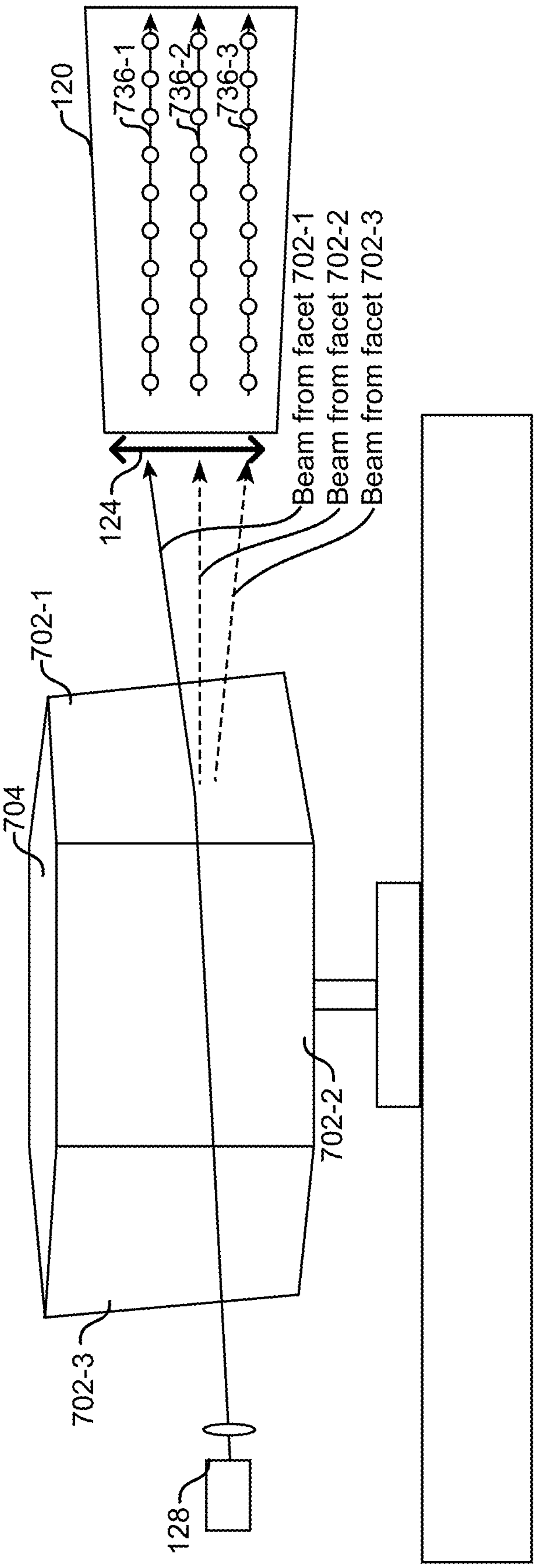
FIG. 7 depicts an embodiment of using multiple angled facets of a rotating mirror to reflect light from a laser into a field of view.

FIG. 7 depicts an embodiment of using multiple angled facets 702 of a rotating mirror 704 to reflect light from a laser 128 into a field of view (FOV) 120. In the embodiment shown in FIG. 7, the routing mirror can be fixed (or removed as shown), and each facet 702 (or two or more facets 702) of the rotating mirror 704 can have a slightly different vertical angles to increase vertical resolution and/or a size of the vertical 124 component of the FOV 120. In FIG. 7, a first scanline 736-1 is reflected from a first facet 702-1; a second scanline 736-2 is reflected from a second facet 702-2, and a third scanline 736-3 is reflected from a third facet 702-3. In some embodiments, a vertical tilt of the second facet 702-2 is equal to or greater than 0.03, 0.05, 0.1, 0.25 degrees and/or equal to or less than 3, 2, or 1 degree (e.g., for the first mode). In some embodiments, a vertical tilt of the second facet 702-2 is equal to or greater than 4, 5, 6, or 8 degrees and/or equal to or less than 25, 20, 15, or 10 degrees (e.g., for the second mode).

Figure 8:
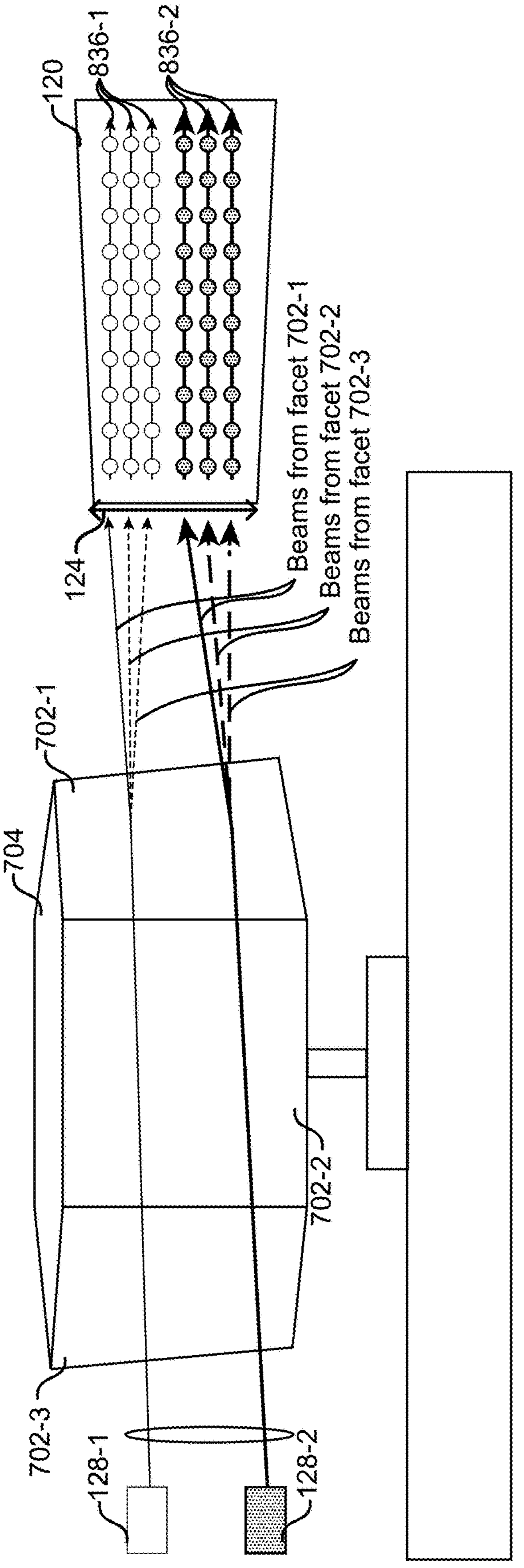
FIG. 8 depicts an embodiment of using a rotating mirror with multiple angled facets with an illumination source comprising two lasers.

FIG. 8 depicts an embodiment of using the rotating mirror 704 with multiple angled facets 702 with an illumination source comprising a first laser 128-1 and a second laser 128-2. The lasers 128 are in an array. The array of lasers is used to increase the size (and/or resolution) of the vertical 124 component of the FOV 120, in a manner analogous shown in FIG. 5, where each laser addresses a different segment of the vertical 124 component of the FOV 120. First scanlines 836-1 correspond to light from the first laser 128-1 and second scanlines 836-2 correspond to light from the second laser 128-2.

Figure 9:
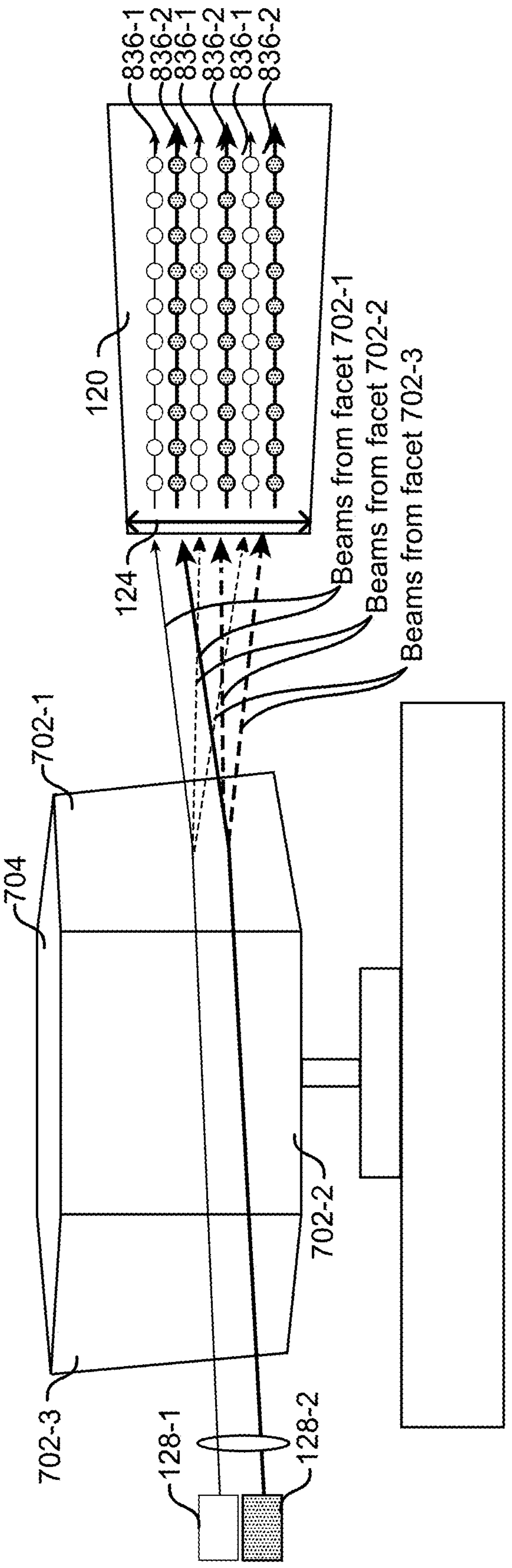
FIG. 9 depicts another embodiment of using a rotating mirror with multiple angled facets with an illumination source comprising two lasers.

FIG. 9 depicts another embodiment of using the rotating mirror 704 with multiple angled facets 702 with an illumination source comprising a first laser 128-1 and a second laser 128-2. More closely spaced lasers 128 in an array of vertical lasers is used to increase the resolution and/or size of the vertical 124 component of the FOV 120 in a manner analogous to FIG. 6. In this case, scanlines 836 from each laser 128 are interlaced with the scanlines 136 from the other laser(s). In FIG. 8, first scanlines 836-1 correspond to light from the first laser 128-1 and second scanlines 836-2 correspond to light from the second laser 128-2.

In some embodiments, a mirror (e.g., rotating mirror 704) comprises a plurality of facets (e.g., facets 702) with different vertical angles. The different vertical angles of the plurality of facets are arranged to reflect light from the illumination source to position light from the plurality of lasers with discrete steps vertically within the field of view (e.g., as shown in FIGS. 7-9).

Figure 10:
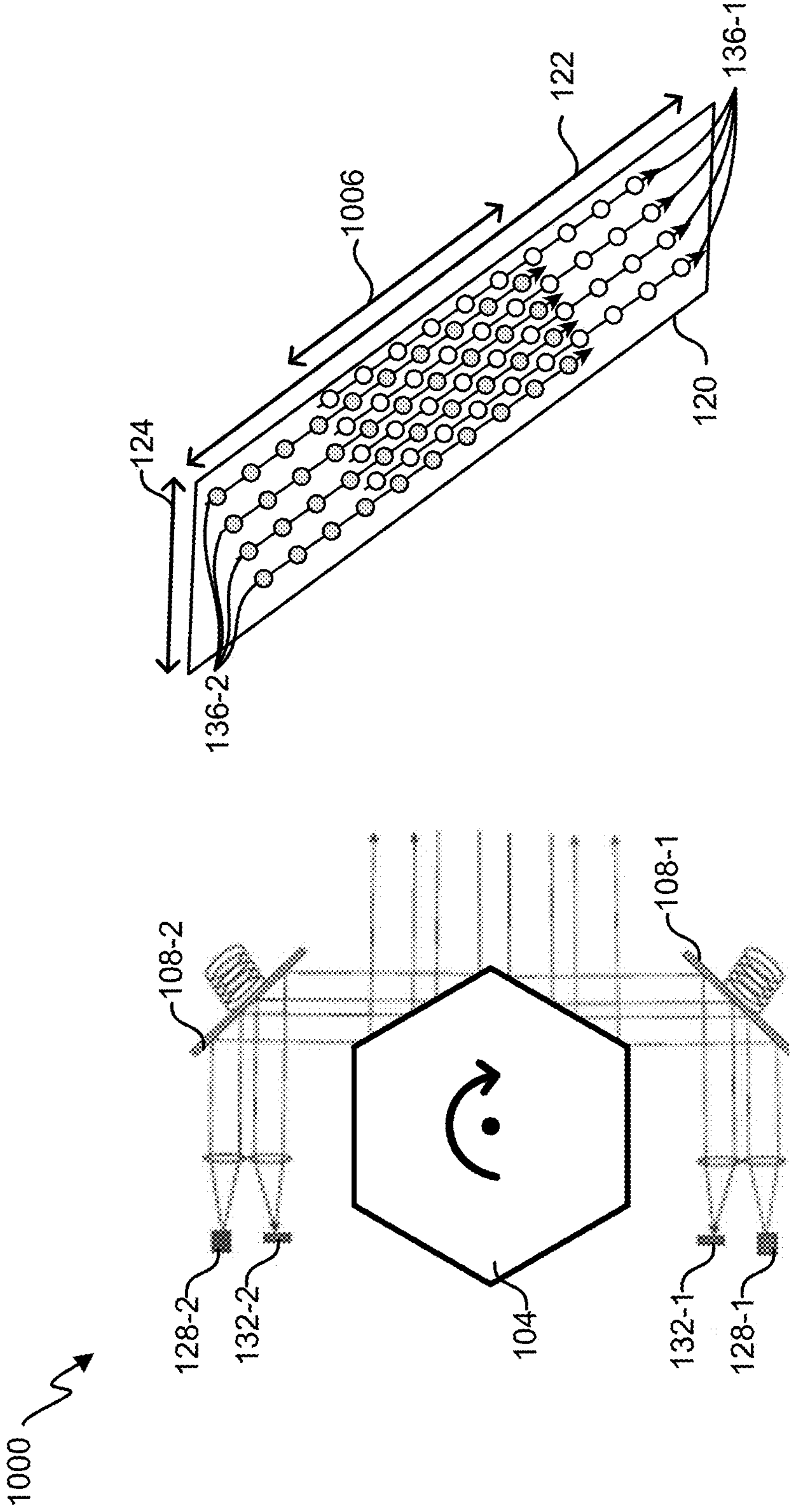
FIG. 10 depicts an embodiment of a lidar comprising two illumination sources and two routing mirrors.

FIG. 10 depicts an embodiment of a lidar system 1000 comprising two illumination sources, a rotating mirror 104, a first routing mirror 108-1, and a second routing mirror 108-2. The first illumination source can comprise a first plurality of lasers (e.g., a first array of lasers). A first laser 128-1 is part of the first illumination source. The second illumination source can comprise a second plurality of lasers (e.g., a second array of lasers). A second laser 128-2 is part of the second illumination source.

The lidar system 1000 comprises a first detector array and a second detector array. A first detector 132-1 is part of the first detector array. A second detector 132-2 is part of the second detector array. The first detector 132-1 is arranged to detect light from the first laser 128-1 that is reflected from an object in the FOV 120. The second detector 132-2 is arranged to detect light from the second laser 128-2 that is reflected from an object in the FOV 120.

Examples shown in FIG. 1 through FIG. 9 may be combined with the second laser array and the second routing mirror 108-2 on another side (e.g., the opposite side) of the rotating mirror 104, thus increasing the overall size of the FOV 120 (e.g., horizontally), and/or allowing for an overlap region of interest (ROI) 1006 where the two sides combined, in an interlaced manner, increase the resolution in a part (e.g., center) of the FOV 120. First scanlines 136-1 correspond to light from the first laser 128-1. Second scanlines 136-2 correspond to light from the second laser 128-2. The first scanlines 136-1 are part of a first scan region. The second scanlines 136-2 are part of a second scan region. The ROI 1006 is an overlap of the first scan region and the second scan region. In some configurations, the second scan region horizontally overlaps at least ⅛ or ¼ of the first scan region and does not overlap more than ⅞ or ¾ of the first scan region.

In some embodiments, the lidar system 1000 comprises a first illumination source comprising a first plurality of lasers; a second illumination source comprising a second plurality of lasers; and a mirror system. The mirror system is arranged to reflect light from the first illumination source and the second illumination source into an environment within a field of view (e.g., FOV 120). The mirror system comprises a first mirror (e.g., rotating mirror 104) arranged to rotate to: reflect light from the first illumination source to scan the first plurality of lasers horizontally within a first scan region of the field of view, and reflect light from the second illumination source (e.g., reflecting light from the second illumination source concurrently with reflecting light from the first illumination source, on two different facets) to scan the second plurality of lasers horizontally within a second scan region of the field of view. The second scan region horizontally overlaps at least ⅛ or ¼ of the first scan region and does not overlap more than ⅞ or ¾ of the first scan region. The mirror system comprises a second mirror (e.g., first routing mirror 108-1) and a third mirror (e.g., second routing mirror 108-2). The second mirror is configured to step between a first set of tilt angles to reflect light from the first illumination source to position light from the first plurality of lasers with discrete steps vertically within the field of view (e.g., first scanlines 136-1). The third mirror is configured to step between a second set of tilt angles to reflect light from the second illumination source to position the second plurality of lasers with discrete steps vertically within the field of view (e.g., second scanlines 136-2) so that light from the second plurality of lasers is vertically offset from the first plurality of lasers within the field of view.

FIG. 10 shows one laser 128 on two sides of the rotating mirror 104. Instead of a single laser 128 on a side, arrays of laser can be used (e.g., as discussed in FIGS. 5 & 6). Accordingly, a discrete step of the first set of tilt angles can be equal to or less than a vertical pitch of the first plurality of lasers in the field of view, and/or a discrete step of the second set of tilt angles can be equal to or less than a vertical pitch of the second plurality of lasers in the field of view (e.g., as discussed in FIG. 5). In some embodiments, a discrete step of the first set of tilt angles can be equal to or greater than a vertical pitch of lasers in the field of view (e.g., as discussed in FIG. 6).

FIGS. 11-14 depicts an embodiment of a steerable lidar system 1100. The steerable lidar system comprises a rotating mirror 104, a first illumination source 1110-1, a second illumination module 1110-2, a first routing mirror 108-1, and a second routing mirror 108-2. The view of FIGS. 11-14 is top-down so that the vertical direction is into and out of the page and horizontal is parallel to a plane of the page.

Figure 11:
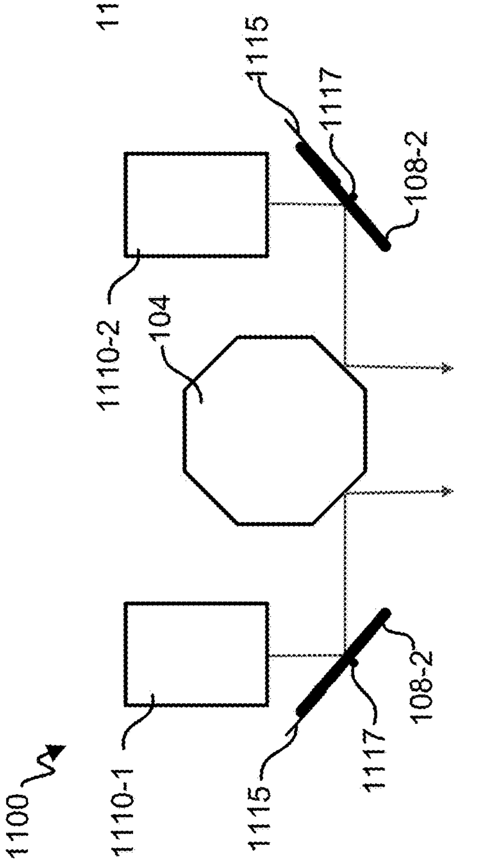
FIG. 11 depicts an embodiment of a steerable lidar system in a central configuration.
Figure 12:
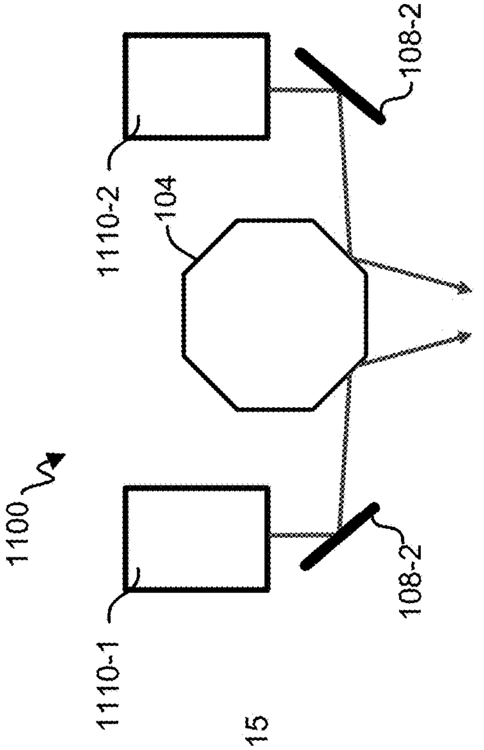
FIG. 12 depicts an embodiment of the steerable lidar system with an adjustable central region of interest.
Figure 13:
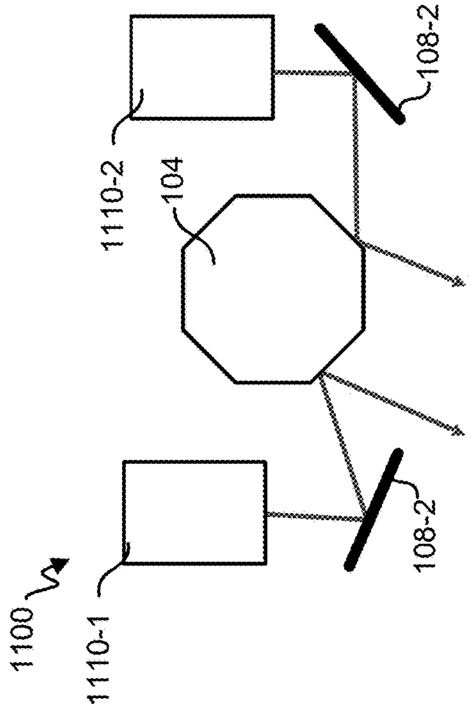
FIG. 13 depicts an embodiment of the steerable lidar system in a left-steering mode.
Figure 14:
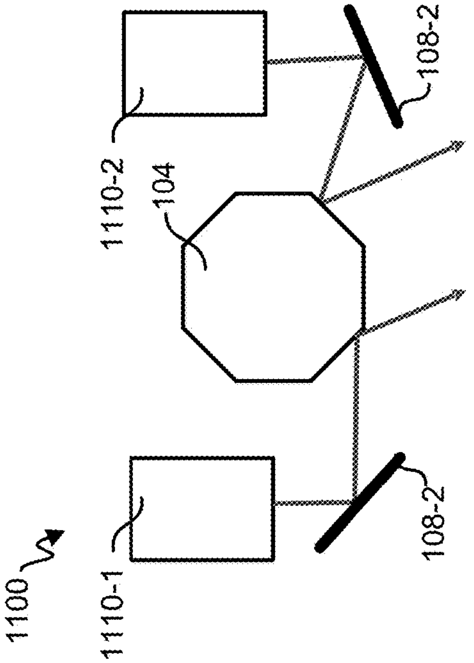
FIG. 14 depicts an embodiment of the steerable lidar system in a right-steering mode.

FIG. 11 depicts an embodiment of the steerable lidar system 1100 in a central configuration. FIG. 12 depicts an embodiment of the steerable lidar system 1100 with an adjustable central region of interest. FIG. 13 depicts an embodiment of the steerable lidar system 1100 in a left-steering mode. FIG. 14 depicts an embodiment of the steerable lidar system 1100 in a right-steering mode.

Routing mirrors 108 on one or both sides of the rotating mirror 104 may be adjusted in the horizontal direction. The speed of this adjustment can typically (but not necessarily) be slow compared to the rotational speed of the rotating mirror 104 and/or a frame rate of the system. The adjustment of the routing mirror(s) 108 in a similar direction would allow the field of view to shift horizontally in order, for example, to track objects of interest as they move across the FOV, and/or to help the lidar see objects that might be around a corner (e.g., as a car is turning around a corner). This is shown in FIGS. 13 and 14. In some embodiments, the routing mirror(s) 108 are be adjusted in opposite directions, as shown in FIG. 12. This allows a size of a central region of interest, where left and right scans overlap, to be adjusted (e.g., made wider or narrower).

In some embodiments, a first mirror (e.g., the rotating mirror 104) is arranged to rotate about a first vertical axis (e.g., vertical axis 116). Routing mirrors 108 are each arranged to rotate about a horizontal axis 1115 to position lasers vertically. Routing mirrors 108 are further each arranged to rotate about a second vertical axis 1117 to change a position of the field of view of the system in relation to the first mirror (e.g., as shown in FIGS. 11-14). The routing mirror 108 is configured to change the position of the field of view of the system horizontally in relation to the rotating mirror 104 and can also change the position of the field of view vertically (e.g., by rotating about the horizontal axis 1115).

In some embodiments, the routing mirror 108 is stepped about the horizontal axis 1115. In some embodiments, the routing mirror 108 is continuously rotating (not moving in discrete steps) about the horizontal axis. In some embodiments, a system for lidar comprises an illumination source comprising a plurality of lasers and a mirror system. The mirror system comprises a first mirror (e.g., rotating mirror 104) and a second mirror (e.g., routing mirror 108). The first mirror is arranged to rotate about a first vertical axis (e.g., axis 116) to reflect light from the illumination source (e.g., first illumination source 1110-1) to scan light from the plurality of lasers horizontally within a field of view of the system. The second mirror is arranged to rotate about a horizontal axis (e.g., horizontal axis 1115) to position light from the plurality of lasers vertically in the field of view. The second mirror is further arranged to rotate about a second vertical axis (e.g., axis 1117) to change a horizontal position of the field of view of the system in relation to the first mirror.

Dead time can result from multiple effects. These can result from things such as the polygon scanning is larger than the desired FOV; the time during which the laser spot is crossing from one polygon mirror to the next and is thus undesirably split into two portions; and/or the laser, or the path of a portion of the scan is obscured by some structure, such as the edge of the routing mirror. By adjusting the angle of the routing mirrors, it is possible to reduce or minimize the dead time. As an example, for a particular implementation, adjusting the routing mirror horizontal angle from 45 degrees to 55 degrees can reduce the dead time from 33% to 11% of the total scanning time.

Figure 15:
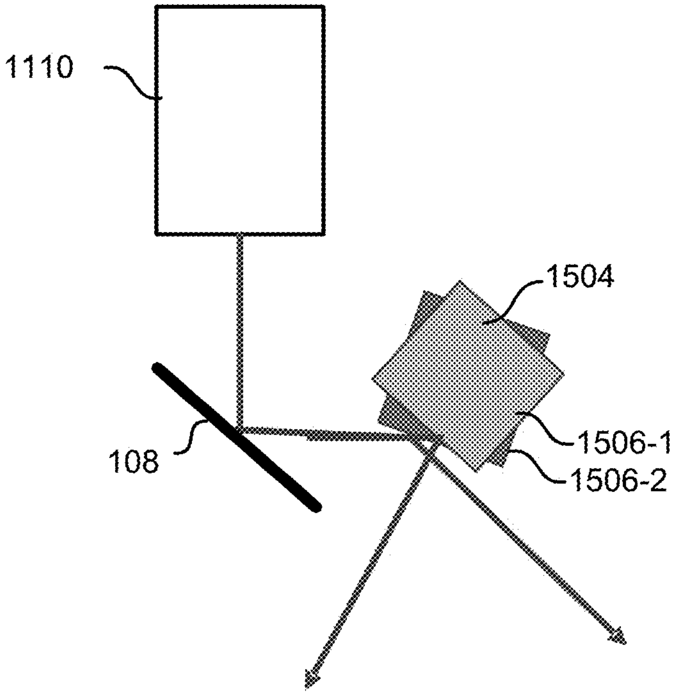
FIG. 15 depicts an embodiment of a lidar system with a stacked polygon mirror.

FIG. 15 depicts an embodiment of a lidar system with a stacked polygon mirror 1504. The stacked polygon mirror comprises a first layer 1506-1 and a second layer 1506-2. The layers 1506 are shown as four-sided polygons that are offset from each other (e.g., at 25, 30, or 45 degrees). The routing mirror 108 and illumination source 1110 are shown.

A single rotating polygon is split into 2 (or more) polygons, stacked on top of each other. Because the width of each facet of the polygon stays approximately the same, the overall diameter of the polygon mirror may be significantly reduced, allowing a reduction in the overall size of the lidar sensor. The two or more layers 1506 share a common axle and motor. In some embodiments, the spot from a single laser strikes both polygons at the same time, so that in the far-field FOV two scan lines are formed separated by a horizontal angle equal to 2× the angle between the upper and lower polygons. In some embodiments, a vertical array of lasers may be used, with a subset of the lasers directed to each of the two or more layers 1506. This embodiment may be combined with other embodiments shown. In some embodiments, a mirror comprises a first layer and a second layer, and the second layer has facets that are offset from facets of the first layer (e.g., as shown in FIG. 15).

Figure 16:
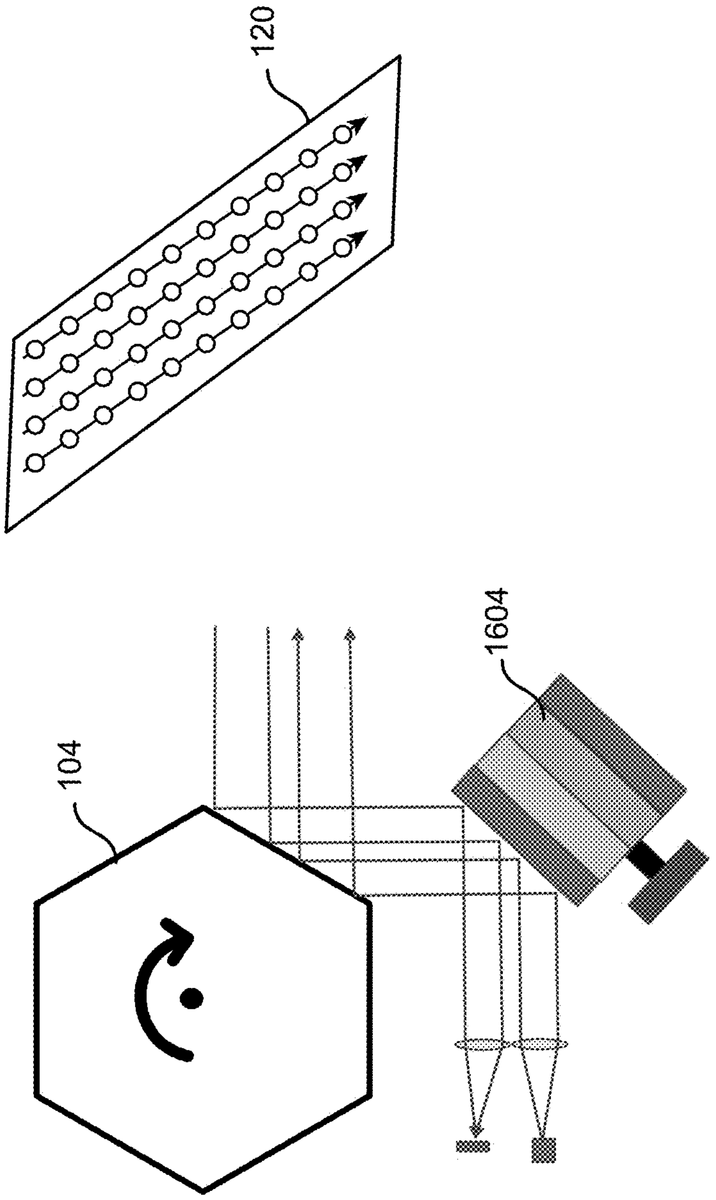
FIG. 16 depicts an embodiment of a lidar system with two spinning mirrors.

FIG. 16 depicts an embodiment of a lidar system with two spinning mirrors. In the embodiment shown in FIG. 16, the rotating mirror 104 is shown. A second rotating mirror 1604 replaces the routing mirror shown in FIG. 1. This can allow similar improvements in vertical FOV size and resolution as shown in FIGS. 3, 5, and/or 6, by replacing the dynamically tilting routing mirror with the rotating mirror 1604. This embodiment may be combined with other embodiments shown in FIGS. 7 through 12. This embodiment may have an advantage in reducing some dead time effects. For example, rotating mirror 104 may be at a rotational angle where it is not directing the laser into the FOV 120, but the second rotating mirror 1604 does direct the laser into the FOV 120. This allows at least some lasers to be firing more frequently, or at all times, and can improve the utilization of lasers and computational units in the electronics.

Figure 17:
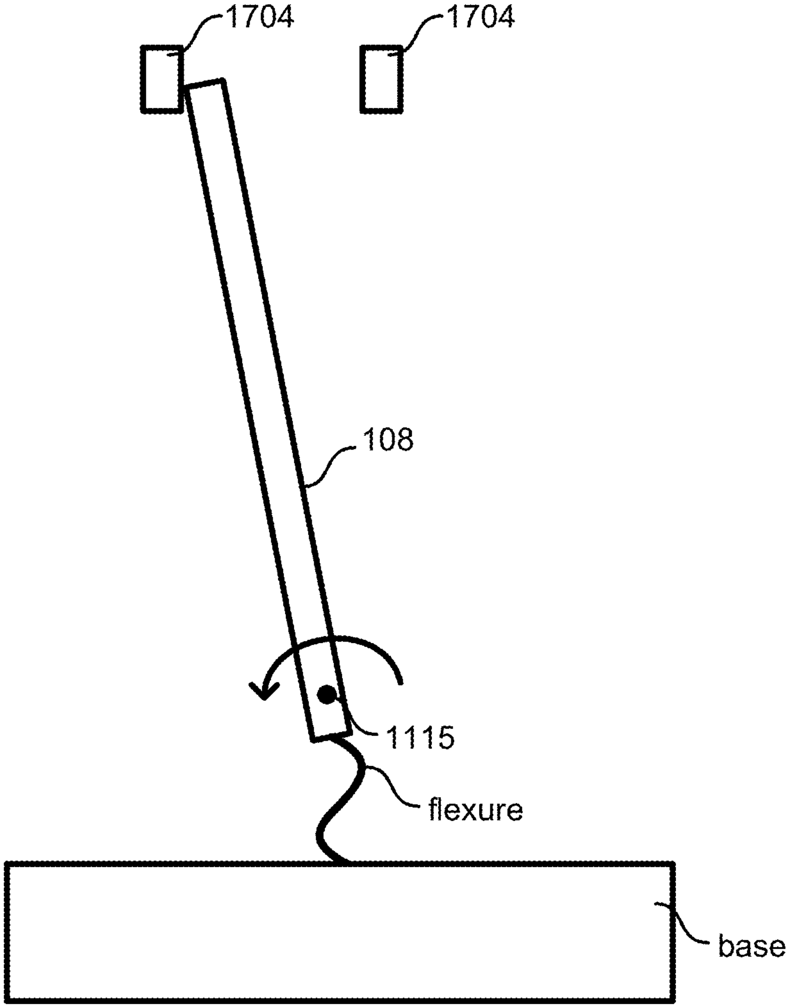
FIG. 17 depicts an embodiment of a routing mirror limited by physical stops.

FIG. 17 depicts an embodiment of a routing mirror 108 limited by physical stops 1704. As routing mirror 108 rotates about a horizontal axis 1115, the routing mirror 108 is stopped by physical stops 1704. Thus, the routing mirror 108 can precisely step between two discrete positions, or steps. In some embodiments, more than two (e.g., 3, 4, 5, 6 or 8) discrete positions, or steps, are used by changing a voltage in a voice coil to a predetermined voltage.

Figure 18:
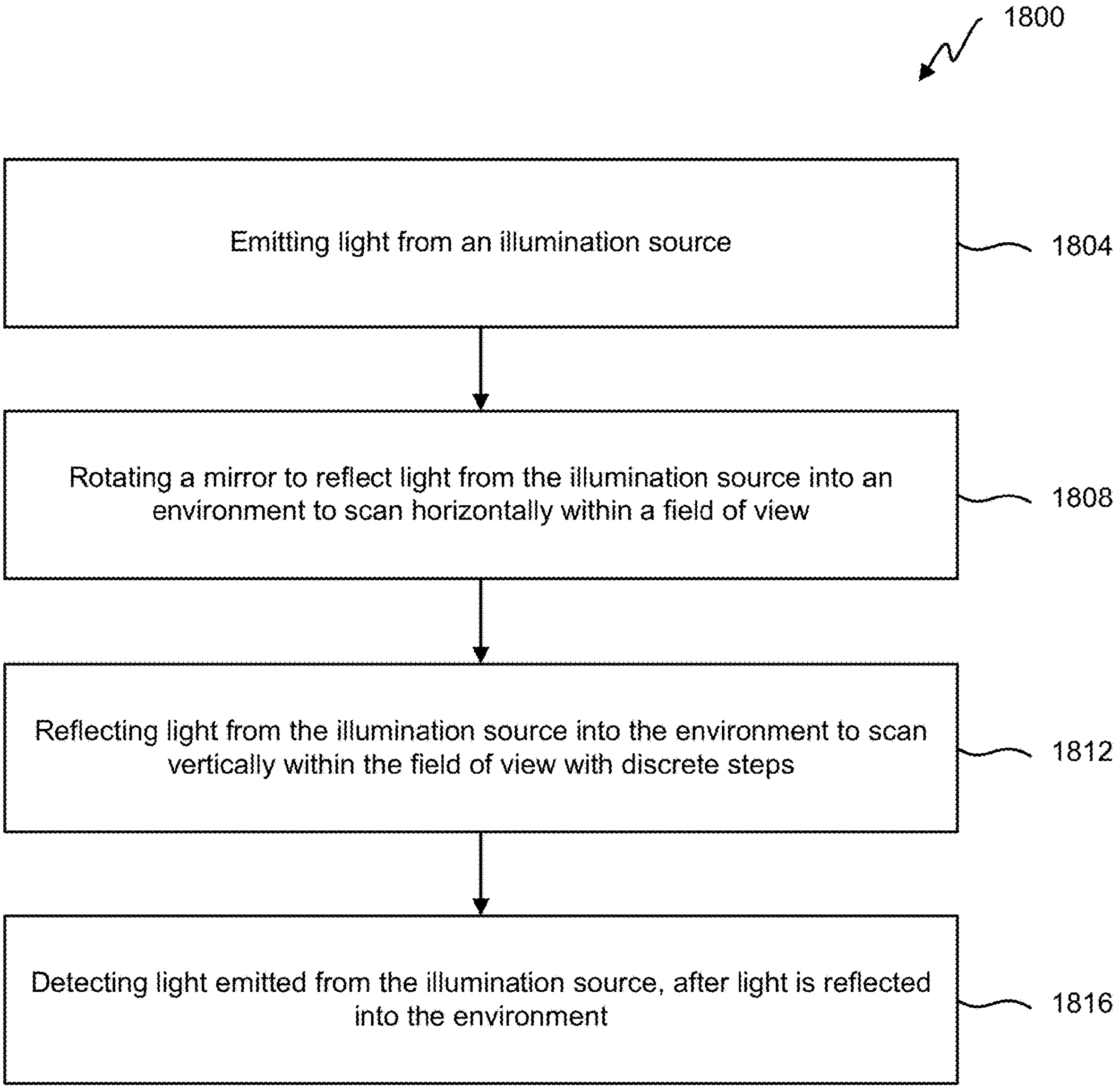
FIG. 18 illustrates a flowchart of an embodiment of a process for lidar scanning with discrete vertical steps.

FIG. 18 illustrates a flowchart of an embodiment of a process 1800 for a lidar scanning with discrete vertical steps. Process 1800 begins in step 1804 with emitting light from an illumination source. The illumination source comprises a plurality of lasers (e.g., a laser array).

In step 1808, a mirror is rotated to reflect light from the illumination source into an environment to scan light from the plurality of lasers horizontally within a field of view. For example, the rotating mirror 104 in FIG. 1 is used to scan light from laser 128 horizontally into the field of view 120.

In step 1812, light from the illumination source is reflected (e.g., by routing mirror 108 in FIG. 1 or rotating mirror 704 in FIG. 7) to position light from the plurality of lasers vertically within the field of view with discrete vertical steps (e.g., with discrete vertical steps, so light is scanned horizontally in a straight line).

In step 1816, a detector (e.g., in a detector array) is used to detect light emitted from the illumination source, after light emitted from the illumination source is reflected into the environment. For example, light emitted into the environment is reflected back by one or more objects in the environment within the field of view of the system. Distances to points are measured based on detecting light reflected by the one or more objects, and the system generates a lidar point cloud.

In some embodiments, the rotating mirror is arranged to spin in a complete circle; a discrete step is equal to or less than a vertical pitch of the plurality of lasers in the field of view (e.g., as shown in FIG. 5); a discrete step is equal to or greater than a vertical pitch of the plurality of lasers in the field of view so that scanlines from lasers of the illumination source are interlaced in the field of view (e.g., as shown in FIG. 6); the mirror comprises a plurality of facets with different vertical angles, and the different vertical angles of the plurality of facets are arranged to reflect light from the illumination source to position light from the plurality of lasers with discrete steps vertically within the field of view (e.g., as shown in FIGS. 7-9); and/or the mirror is a first mirror, and the method comprises reflecting light from the illumination source using a second mirror to position light from the plurality of lasers with discrete steps vertically within the field of view by tilting the second mirror at different angles by stepping between different tilt angles (e.g., by using the routing mirror 108 in FIG. 16).

In some embodiments, the illumination source is a first illumination source; the method comprises reflecting light, using the mirror, from a second illumination source into the field of view; light from the first illumination source is reflected into a first scan region; light from the second illumination source is reflecting into a second scan region; and/or the second scan region horizontally overlaps at least ⅛ or ¼ of the first scan region and does not overlap more than ⅞ or ¾ of the first scan region (e.g., as shown in FIG. 10). In some embodiments, the mirror is a first mirror, and the method comprises changing a position of the field of view in relation to the first mirror using a second mirror (e.g., as shown in FIGS. 11, 13, and 14). In some embodiments, the method comprises adjusting the region of interest (e.g., using routing mirrors 108 in FIG. 12 to increase or decrease the overlap of light from illumination sources to increase or decrease the region of interest).

Various features described herein, e.g., methods, apparatus, computer-readable media and the like, can be realized using a combination of dedicated components, programmable processors, and/or other programmable devices. Some processes described herein can be implemented on the same processor or different processors. Where some components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Details are given in the above description to provide an understanding of the embodiments. However, it is understood that the embodiments may be practiced without some of the specific details. Examples in different figures may be combined in various ways to enhance performance or modified for a specific application. In some instances, well-known circuits, processes, algorithms, structures, and techniques are not shown in the figures.

While the principles of the disclosure have been described above in connection with specific apparatus and methods, it is to be understood that this description is made only by way of example and not as limitation on the scope of the disclosure. Embodiments were chosen and described in order to explain principles and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A system of lidar comprising:
- a first illumination source comprising a first plurality of lasers;
- a second illumination source comprising a second plurality of lasers;
- a mirror system, wherein:
  - the mirror system is arranged to reflect light from the first illumination source and the second illumination source into an environment within a field of view;
  - the mirror system comprises a first mirror arranged to rotate to:
    - reflect light from the first illumination source to scan the first plurality of lasers horizontally within a first scan region of the field of view; and
    - reflect light from the second illumination source to scan the second plurality of lasers horizontally within a second scan region of the field of view; and
    - the second scan region horizontally overlaps at least ⅛ or ¼ of the first scan region and does not overlap more than ⅞ or ¾ of the first scan region;
  - the mirror system comprises a second mirror and a third mirror;
  - the second mirror is configured to step between a first set of tilt angles to reflect light from the first illumination source to position light from the first plurality of lasers with discrete steps vertically within the field of view;
  - the third mirror is configured to step between a second set of tilt angles to reflect light from the second illumination source to position the second plurality of lasers with discrete steps vertically within the field of view so that light from the second plurality of lasers is vertically offset from the first plurality of lasers within the field of view;
  - a discrete step of the first set of tilt angles is equal to or less than a vertical pitch of the first plurality of lasers in the field of view; and
  - a discrete step of the second set of tilt angles is equal to or less than a vertical pitch of the second plurality of lasers in the field of view.

2. A system for lidar comprising:
- an illumination source comprising a plurality of lasers; and
- a mirror system, wherein:
  - the mirror system is arranged to reflect light from the illumination source into an environment within a field of view;
  - the mirror system comprises a mirror arranged to rotate to reflect light from the illumination source to scan light from the plurality of lasers horizontally within the field of view of the system; and
  - the mirror system is arranged to reflect light from the illumination source to position light from the plurality of lasers vertically within the field of view with discrete vertical steps.

3. The system of claim 2, wherein a discrete step is equal to or less than a vertical pitch of the plurality of lasers in the field of view.

4. The system of claim 2, wherein a discrete step is equal to or greater than a vertical pitch of the plurality of lasers, so that scanlines from lasers of the illumination source are interlaced in the field of view.

5. The system of claim 2, wherein:
- the mirror comprises a plurality of facets with different vertical angles; and
- the different vertical angles of the plurality of facets are arranged to reflect light from the illumination source to position light from the plurality of lasers with discrete steps vertically within the field of view.

6. The system of claim 2, wherein:
- the mirror is a first mirror;
- the mirror system comprises a second mirror; and
- the second mirror is configured to step between tilt angles to reflect light from the illumination source to position light from the plurality of lasers with discrete steps vertically within the field of view.

7. The system of claim 6, wherein:
- the second mirror is arranged to receive a dithering signal that dithers the second mirror at a dithering frequency;
- each laser of the plurality of lasers emits pulses of light at a firing rate; and
- the dithering frequency is equal to or less than the firing rate and equal to or greater than 1/10 of the firing rate.

8. The system of claim 2, wherein:
- the illumination source is a first illumination source;
- the plurality of lasers is a first plurality of lasers;
- the system comprises a second illumination source;
- the second illumination source comprises a second plurality of lasers;
- the mirror is a first mirror;
- the mirror system further comprises:
  - a second mirror; and
  - a third mirror;
- the second mirror is arranged to reflect light from the first illumination source to scan the first plurality of lasers horizontally within a first scan region of the field of view of the system;
- the third mirror is arranged to reflect light from the second illumination source to scan the second plurality of lasers horizontally within a second scan region of the field of view of the system;
- the second mirror is configured to step between a first set of tilt angles to reflect light from the first illumination source to position light from the first plurality of lasers with discrete steps vertically within the field of view; and the third mirror is configured to step between a second set of tilt angles to reflect light from the second illumination source to position the second plurality of lasers with discrete steps vertically within the field of view so that light from the second plurality of lasers is vertically offset from the first plurality of lasers within the field of view.

9. The system of claim 8, wherein the second scan region horizontally overlaps at least ⅛ or ¼ of the first scan region and does not overlap more than ⅞ or ¾ of the first scan region.

10. The system of claim 2, wherein:

the mirror is a first mirror;

the first mirror is arranged to rotate about a first vertical axis;

the mirror system comprises a second mirror;

the second mirror is arranged to rotate about a horizontal axis to position light from the plurality of lasers vertically in the field of view; and the second mirror is arranged to rotate about a second vertical axis to change a position of the field of view of the system in relation to the first mirror.

11. The system of claim 10, wherein the second mirror is configured to change the position of the field of view of the system vertically and horizontally in relation to the first mirror.

12. The system of claim 2, wherein:

the mirror comprises a first layer and a second layer; and the second layer has facets that are offset from facets of the first layer.

13. A method for lidar comprising:

emitting light from an illumination source that comprises a plurality of lasers;

rotating a mirror to reflect light from the illumination source into an environment to scan light from the plurality of lasers horizontally within a field of view;

reflecting light from the illumination source to position light from the plurality of lasers vertically within the field of view with discrete vertical steps; and detecting, using a detector, light emitted from the illumination source, after light emitted from the illumination source is reflected into the environment.

14. The method of claim 13, wherein the mirror is arranged to spin in a complete circle.

15. The method of claim 13, wherein a discrete step is equal to or less than a vertical pitch of the plurality of lasers in the field of view.

16. The method of claim 13, wherein a discrete step is equal to or greater than a vertical pitch of the plurality of lasers in the field of view so that scanlines from lasers of the illumination source are interlaced in the field of view.

17. The method of claim 13, wherein:

the mirror comprises a plurality of facets with different vertical angles; and the different vertical angles of the plurality of facets are arranged to reflect light from the illumination source to position light from the plurality of lasers with discrete steps vertically within the field of view.

18. The method of claim 13, wherein:

the mirror is a first mirror; and the method comprises reflecting light from the illumination source using a second mirror to position light from the plurality of lasers with discrete steps vertically within the field of view by tilting the second mirror at different angles by stepping between different tilt angles.

19. The method of claim 13, wherein:

the illumination source is a first illumination source;

the method comprises reflecting light, using the mirror, from a second illumination source into the field of view;

light from the first illumination source is reflected into a first scan region;

light from the second illumination source is reflecting into a second scan region; and the second scan region horizontally overlaps at least ⅛ or ¼ of the first scan region and does not overlap more than ⅞ or ¾ of the first scan region.

20. The method of claim 13, wherein:

the mirror is a first mirror; and the method comprises changing a position of the field of view in relation to the first mirror using a second mirror.

* * * * *